United States Patent
Murguia et al.

(10) Patent No.: US 7,888,624 B1
(45) Date of Patent: Feb. 15, 2011

(54) SIMULTANEOUS SPECTRAL IMAGING SYSTEM INCLUDING COMMONLY FILTERED OPTICAL PATHS DEFINED BY FOCUSING ELEMENTS EXHIBITING DISPARATE F-NUMBERS

(75) Inventors: James E. Murguia, Hollis, NH (US); Richard J. Nelson, Brookline, NH (US)

(73) Assignee: Solid State Scientific Corporation, Hollis, NH (US)

( * ) Notice: Subject to any disclaimer, the term of this patent is extended or adjusted under 35 U.S.C. 154(b) by 660 days.

(21) Appl. No.: 11/986,790

(22) Filed: Nov. 26, 2007

Related U.S. Application Data

(60) Provisional application No. 60/860,926, filed on Nov. 24, 2006.

(51) Int. Cl.
G01J 3/51 (2006.01)

(52) U.S. Cl. ............ 250/208.1; 250/226; 356/419

(58) Field of Classification Search ......... 250/208.1, 250/226, 554, 330, 332, 338.1, 338.4, 339.11, 250/339.14, 339.15, 370.08; 356/45, 419
See application file for complete search history.

(56) References Cited

U.S. PATENT DOCUMENTS

| | | | | |
|---|---|---|---|---|
| 5,258,618 A * | 11/1993 | Noble | | 250/332 |
| 5,479,015 A | 12/1995 | Rudman et al. | | |
| 5,926,283 A * | 7/1999 | Hopkins | | 356/419 |
| 5,982,497 A * | 11/1999 | Hopkins | | 356/419 |
| 6,222,631 B1 * | 4/2001 | Terauchi | | 356/419 |
| 6,856,466 B2 * | 2/2005 | Tocci | | 359/663 |
| 7,253,895 B2 * | 8/2007 | Kauffman et al. | | 356/326 |
| 7,297,951 B2 * | 11/2007 | Chen et al. | | 250/339.02 |
| 7,718,968 B1 * | 5/2010 | Murguia | | 250/339.15 |

* cited by examiner

*Primary Examiner*—John R Lee
(74) *Attorney, Agent, or Firm*—Louis J. Franco; Law Office of Louis J. Franco

(57) ABSTRACT

A multi-image detector assembly for detecting a plurality of correlated images of a single scene over a plurality of disparate electromagnetic wavelength sets includes an imaging-sensor array, a plurality of focusing elements and a plurality of optical filtering elements. The imaging-sensor array has a plurality of detector-array sections, each of which detector-array sections comprises at least two detector-array subsections dedicated to the detection of a common wavelength set associated with that detector-array section. Each focusing element is aligned for focusing upon a corresponding one of the plurality of detector-array sub-sections an image of the scene correlating to the images of the scene focused upon other detector-array sub-sections by the other focusing elements. Additionally, each focusing element and its corresponding detector-array sub-section defines an optical path and each detector-array section has associated with it at least two such optical paths. At least two detector-array subsections belonging to each common detector-array section are configured to register images that are commonly filtered by a single optical filtering element.

11 Claims, 2 Drawing Sheets

SIMULTANEOUS SPECTRAL IMAGING SYSTEM INCLUDING COMMONLY FILTERED OPTICAL PATHS DEFINED BY FOCUSING ELEMENTS EXHIBITING DISPARATE F-NUMBERS

PROVISIONAL PRIORITY CLAIM

Priority based on Provisional Application Ser. No. 60/860,926, filed Nov. 24, 2006, and entitled "SIMULTANEOUS SPECTRAL IMAGING SYSTEM INCLUDING COMMONLY FILTERED OPTICAL PATHS DEFINED BY FOCUSING ELEMENTS EXHIBITING DISPARATE F-NUMBERS," is claimed. Moreover, the entirety of the previous provisional application, including the drawings, is incorporated herein by reference as if set forth fully in the present application.

BACKGROUND

In a contemporary detection system, a viewed target or scene forms a single image upon a focal-plane detector array including a large number of discrete detector elements that are highly responsive to electromagnetic energy within a pre-selected wavelength range. The electrical outputs of the detector elements are communicatively linked to sophisticated signal processing circuitry. By rapidly analyzing the pattern and sequence of detector element excitations, the processing circuitry can identify and monitor sources of electromagnetic radiation that appear within a scene or field of view.

When it is desired to view a scene over different portions (wavelength ranges) of the electromagnetic spectrum, the scene is filtered through one or more optical filtering elements. In a traditional system, mechanically movable filters are interposed into an optical path defined by a focusing element and a corresponding section of the detector array onto which that focusing element projects an image of the scene. Generally, such filtering elements are selectively situated intermediate the focusing element and the detector array.

Practitioners in the field of spectral imaging have recognized shortcomings of systems that rely on the selective mechanical interposition of filters within an optical path in order to image a scene over different wavelength ranges. Among the disadvantages associated with such systems are the facts that they are inherently expensive, heavy, large and fragile. More specifically, the use of mechanisms to effect movement of the filters adds costs and weight to the detection system. More significantly, such mechanisms are mechanically complex and require a high degree of precision to obtain the desired results. Thus, the reliability and durability of moveable filters, and their drive mechanisms, are of particular concern. This is especially true in space-based applications wherein it is extremely difficult or impossible to conduct "field" repair of such systems. Mechanical movement of the filters also introduces an observation dead time associated with (i) the generation of control signals to initiate the filter change, (ii) settle-down times that depend on the inertial characteristics of the mechanical components, (iii) and slow speeds that may be necessary in order to preserve optical alignment, avoid setting up vibration, and prevent damage to fragile optics. In some military systems requiring extremely rapid response times, any time loss associated with filter switching may be highly undesirable or even unacceptable. Moreover, and quite significantly, moveable filters (e.g., filter wheels) provide spectral data that is necessarily sequential in nature. More specifically, a scene is viewed through a first filter and data representative of the scene is registered at the detector array and stored in computer memory. Subsequently, a second filter is moved into position to filter the scene over another wavelength range, and the procedure is repeated over as many filtered wavelength ranges as the particular application calls for. Much more desirable is the acquisition of all spectral data through all filter elements simultaneously. This is particularly important when viewing rapidly changing events such as missile launches, muzzle flashes, or other ephemeral events.

In recognition of the aforementioned considerations, multi-image detector assemblies have been developed. Such an assembly does not require the use of moveable filters or other optical components in order to sense different portions of the electromagnetic spectrum or otherwise modify the incoming source signal. Representative of such an assembly is that disclosed in U.S. Pat. No. 5,479,015 issued in the names of Rudman et al. on Dec. 26, 1995 (hereinafter, the '015 patent). The '015 patent is drawn to a multi-image detector assembly including an array of detector elements (e.g., a focal plane array) wherein the detector array includes a plurality of imaging-registering sections. Corresponding to each image-registering section is a focusing member that focuses an image of a scene upon the image-registering array section. The plural images focused upon the various array sections are, at least in their spatial aspects, substantially identical.

Each focusing member defines, in combination with its corresponding array section, an optical path. Disposed within, and dedicated to, each optical path is an optical element that modifies the image transmitted along that optical path. The "optical elements" are optical filters that facilitate registration of various images of a single scene simultaneously over disparate wavelength regions within the electromagnetic spectrum.

While the assembly of the '015 patent certainly alleviates the aforementioned shortcomings of systems employing sequential, mechanically-driven filter substitution, systems relying on either sequential or simultaneous image acquisition include certain undesirable or limiting characteristics. For instance, in the traditional sequential image-acquisition system represented by the inclusion of a mechanical filter wheel, for example, a "full-sized" image is registered at the detector array, and data representative of that image is stored in computer memory, for each filtered wavelength range. The data representative of each full-sized image is then algorithmically analyzed in order to render determinations as to whether at least one event of interest appears in each image. This sequential analysis is undertaken continuously over full-sized images in each predetermined wavelength range whether an event of interest is present or not in the monitored field of view. Similarly, while the "full-sized" images associated with a simultaneous image-acquisition system such as that of the '015 patent may be smaller than the full-sized images associated with a sequential image-acquisition system because the image associated with each filtered wavelength range of interest is focused upon a dedicated fraction of the overall detector array, a system such as that of the '015 patent still continuously and simultaneously acquires what, relative to it, are full-sized images over each filtered wavelength range and analyzes these in search of interesting events. In other words, it is a common objective of the previous systems to continuously utilize as much of the available area of the detector array as possible in order to maximize the resolution of each acquired image. In either case, maximized use of the detector-array surface area produces a continuous series of computationally-intensive data frames requiring storage and analysis, even when there are no events of interest present in various frames over various wavelength ranges. Another shortcoming of contemporary imaging systems, whether they capture images sequentially or simultaneously, is that they include a single filter and lens pair corresponding to each wavelength range over which they are designed to capture images. Accordingly, for example, in a typical multi-image detector assembly such as that disclosed in the '015 patent, if one of the focusing members, or its corresponding optical filter incurs mechanical damage, the system will no longer be capable of cleanly imaging a scene over the wavelength range to which the damaged focusing member, or its corresponding optical filter, corresponds unless and until repairs can be made. Under certain conditions, especially those relating to a military operation, a damaged lens of optical filter could deny to personnel or their weapons system critical data regarding a potential threat or target.

Accordingly, there exists a need for a multi-image detector assembly that, in alternative embodiments, at least one of (i) provides redundant images relative to each wavelength range of a selected set of wavelength ranges over which a detection system is designed to register images of a scene, and (ii) facilitates monitoring of a field of view through the simultaneous acquisition of correlated images over multiple, predetermined ranges of the electromagnetic spectrum by utilizing some minimized portion of a detector array while in a "monitoring" mode and that selectively utilizes a larger area of the detector array when circumstances justify the consequent consumption of increased computer memory and analytical resources.

SUMMARY

In one illustrative implementation, a multi-image detector assembly for detecting a plurality of correlated images of a single scene over a plurality of disparate electromagnetic wavelength sets (e.g. ranges or portions) includes a plurality of photosensitive detector elements and a plurality of optical focusing elements. In a typical embodiment, the detector elements are situated so as to form an array structure of a type known to those of ordinary skill in the relevant arts, and alternatively referred to as a "focal plane array," a "detector array," an "imager," an "imaging-sensor array" or some similar, alternative designation. In various versions, the detector array comprises a plurality of predefined detector-array sections, each of which detector-array sections itself comprises at least two detector-array subsections. The detector-array subsections of each detector-array section are dedicated to the detection of a common wavelength set associated with the detector-array section to which those detector-array subsections belong.

Situated in optical communication with the detector array is a plurality of optical focusing elements. The optical focusing elements of alternative versions may be of one or more general types including, but not limited to (i) lenses, (ii) lenslets, (iii) reflective elements including, for example, concave mirrors, and (iv) graded-refractive-index (GRIN) elements including GRIN optical fibers, by way of non-limiting example. In each of various versions, the plural optical focusing elements are integrally formed within a unitary plate or sheet-like, translucent substrate made from a material such as glass or plastic. Each of the focusing elements is aligned for focusing upon a corresponding one of the plurality of detector-array sub-sections an image of a scene correlating to the images of the same scene focused upon other detector-array sub-sections by the other focusing elements. Each focusing element and its corresponding array sub-section define a unique optical path. Accordingly, in versions of the type currently under consideration, each detector-array section has associated with it at least two optical paths.

The detector assembly further includes a plurality of optical filtering elements. Each filtering element is configured to pass a pre-selected wavelength set of interest that is within the sensitivity range of the detector array. In various embodiments, at least two detector-array subsections belonging to each common detector-array section are configured to register images that are commonly filtered by a single optical filtering element. In other words, in such embodiments, each optical filtering element or a selected set of filtering elements is disposed within at least two optical paths associated with a common detector-array section. "Optical path" is defined herein such that each optical path extends forward of the focusing element that defines it. Accordingly, the optical filtering element associated with each optical path may be situated between the focusing element and its corresponding detector-array subsection or "forward of" the focusing element such that the focusing element is situated between the filtering element and the detector-array subsection. In addition, the optical filtering element is, in alternative versions, a spectral and/or polarizing filter that is (i) a structure separately identifiable from the detector array and the at least one focusing element with which it is aligned, (ii) a coating applied to either side of the focusing element, and (iii) a coating applied to a set of detector elements.

In some versions, there are associated with each pre-selected wavelength range to be detected two focusing elements exhibiting disparate f-numbers. As is known to those in the optical arts, the f-number, which is sometimes referred to as the focal ratio, of a focusing element is given by N=f/D, where f is the focal length and D is the diameter of the "entrance pupil." In various embodiments, focusing elements focusing images over the same wavelength range onto the detector array are used to create a minor, or smaller image, and a major, or larger, image. The images are correlated in terms of scene content, but one image is essentially a larger (or smaller) copy of the other. This effect is achieved by using focusing elements of differing diameters because, in a typical implementation, the focal lengths of the various focusing elements will not differ drastically, if at all. That the focal lengths of the focusing elements will be similar is particularly true when all of the focusing elements of an embodiment are formed within a unitary translucent structure (e.g., a lenslet array) as previously described. When the detector elements of the detector array are of uniform size and regularly spaced, which is a design objective typically associated with a focal plane array, the larger image projected by the focusing element with the smaller f-number will be projected onto a larger number of detector elements than the smaller image projected by the focusing element with the larger f-number. Each detector element represents a single "pixel" (picture element) and, as previously described in the background, is communicatively linked with complex circuitry that permits data representative of signals registered at that detector to by stored in computer memory and processed for spectral analysis. An image comprising a greater number of pixels than a second image is often regarded by practitioners in the field as being of higher "resolution" than the second image, even though international standards specify that the term "resolution" is misapplied in such a case and indicates, instead, pixel density. However, because "resolution" is used so pervasively to indicate overall pixel count, without regard for pixel density, "resolution" shall be, for purposes of the specification and the appended claims, interpreted so as to include, and primarily mean, pixel count.

As those of skill in the relevant technical disciplines know, the larger the number of detector elements over which a digital image is captured, the more data there is associated with the image; data requiring computer memory and, when analyzed, analytical (i.e., algorithmic processing) resources. In current systems, such as that of the '015 patent, this processing is performed in connection with each image over each wavelength for each "data frame." It will be appreciated that, in such a system, large amounts of data storage and processing resources are consumed in the storage and processing of "full-size" images of scenes containing no interesting events or, perhaps, containing interesting events, but over fewer than all of the pre-selected wavelengths over which the system is configured to filter and detect. Accordingly, various implementations of a spectral analysis system including a multi-image detector assembly facilitate the acquisition of images over various wavelength ranges at a first resolution and then, when the presence of an interesting event is "suspected" in a low-resolution image associated with at least one of the wavelength ranges of the predetermined wavelength ranges that the system is designed to process, selectively registering, storing and/or analyzing a second, higher resolution image of the scene over that at least one wavelength range in order to facilitate a more detailed spectral analysis, spatial analysis or both. Various implementations involving alternative utilization of each of two images associated with a single filtered wavelength set are described in more detail in the following paragraphs.

In one alternative implementation which, for references purposes, is conceptualized as a "power-saving" mode, each wavelength set over which the system is configured to process has associated with it a small focusing element and a large focusing element. The system "monitors" a scene by registering at the detector array only the images projected onto the detector array by the small focusing elements. When, based on spectral or spatial analysis of the "small image" associated with at least one wavelength set, an interesting event appears warranting the acquisition of a more detailed image of the event over the at least one wavelength set, the detectors within the larger detector-array sub-section associated with the at least one wavelength over which the interesting event was detected within the small image are activated in order to enable the acquisition and algorithmic analysis of the larger, higher-resolution image for at least one of (i) spectral and (ii) spatial details. A system with such "selectively activatible" detectors saves energy by keeping the detectors associated with the larger detector-array sub-sections off (i.e., inactive) until they are needed. Consequently, data-storage and computational resources are also conserved for use on an "as needed" basis.

In another version configured to save data-storage and computational resources, the system includes a "memory-saving" mode. In a memory-saving mode, the detectors used to acquire a large image are active, but the signals that they produce in response to the impingement thereon of electromagnetic energy are not stored in computer memory when the system is in a memory-saving mode. However, in a manner analogous to that described in connection with the energy-saving mode, when an event of interest is detected in a small image associated with a particular wavelength set, the system is triggered to begin saving in computer memory the signals generated by the detectors associated with the large image corresponding to the wavelength set over which the event of interest was detected in the small image.

In still another, "computation-saving" or "process-saving" mode, data corresponding to signals generated by detectors associated with the large image associated with each wavelength set are stored in computer memory, but are operated on (i.e., algorithmically processed) only if the presence of an interesting event is indicated in the corresponding small image associated with the same wavelength set.

In alternative versions, the small and large images associated with each detected wavelength set may undergo similar or disparate algorithmic processing. For instance, if, based on at least one of (i) spectral and (ii) spatial analysis of the small image registered over with a particular wavelength set, an algorithm determines that analysis of the corresponding larger image is warranted, the larger may be subjected to the same type of analysis to which the small image was subjected; that is, either or both of spectral and spatial analysis, for example. Alternatively, if, for instance, one of a (i) spectral and (ii) spatial analysis of a small image indicates the presence within a scene of an interesting event, the corresponding larger image may be subjected to the other of (i) spectral and (ii) spatial analysis or to both (i) spectral and (ii) spatial analysis.

In various alternative versions, each pre-selected wavelength set over which images are to be detected and registered has associated with it at least two focusing elements designed to exhibit the same f-number such that they project onto the detector array images of similar dimensions and pixel count. In alternative versions that produce at least one small image and at least one large image in association with each pre-selected wavelength set, at least two focusing elements corresponding to two large images are associated with each wavelength set in order to provide redundancy among the larger images. In one example of such a system, a single small image associated with each wavelength set is provided for purposes such as monitoring a scene over that wavelength set, as described above, while dual focusing members are associated with each wavelength set in order to hedge against mechanical damage to portions of the system optics, by way of non-limiting example. In another set of embodiments, each wavelength set has associated with it a focusing element for producing a single large image and a focusing element for producing each of at least two small images. In an illustrative configuration in which two small images and one large image is produced in association with each wavelength set, the two smaller images may be registered at the detector array may by acquired for different purposes. For instance, a first small image may be monitored for spatial features, while its companion image may be monitored for spectral characteristics. In still additional versions providing image redundancy, each wavelength set has associated with it only at least two focusing elements exhibiting the same f-number such that all images associated with any particular wavelength set are of substantially the same dimensions and pixel count.

Representative, non-limiting implementations are more completely described and depicted in the following detailed description and the accompanying drawings.

DETAILED DESCRIPTION

The following description of variously embodied multi-image detector assemblies and a spectral analysis system incorporating multi-image detector assembly is demonstrative in nature and is not intended to limit the invention or its application of uses. Accordingly, the various implementations, aspects, versions and embodiments described in the summary and detailed description are in the nature of non-limiting examples falling within the scope of the appended claims and do not serve to define the maximum scope of the claims.

Figure 1:
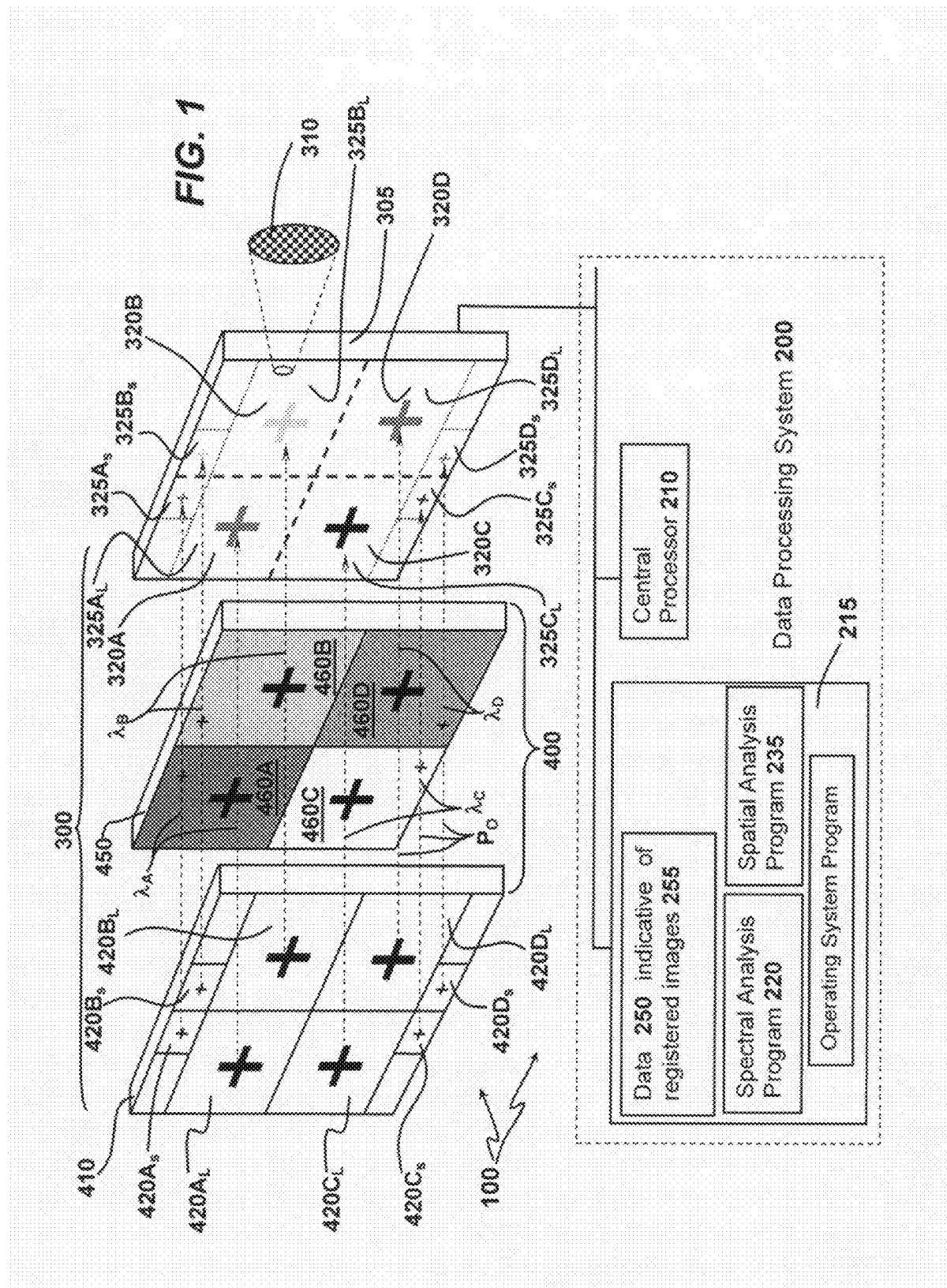
FIG. 1 is a schematic representation of an illustrative spectral analysis system and associated multi-image detector assembly.

Referring to FIG. 1, the architecture of an illustrative spectral analysis system 100 is schematically represented and includes (i) a data processing system 200 and (ii) a multi-image detector assembly 300 including (a) an imaging-sensor array 305 communicatively linked to the data processing system 200 and (b) an optical system 400 configured for imaging electromagnetic energy emitted from an object source event (not shown) external to the optical system 400 onto the imaging-sensor array 305. The imaging-sensor array 305 may be alternatively referred to as the "detector array 305" in the current description.

The data processing system includes a central processor 210 and a memory 215 and is programmed to execute at least one of spectral analysis algorithms 220 and a spatial analysis program 235 as described in more detail elsewhere in this description. Alternative implementations incorporate any of a variety of conventional detector arrays 305 configured to detect wavelengths over a predetermined range of electromagnetic wavelengths. A typical detector array 305 suitable for implementing embodiments of the invention includes photosensitive detector elements 310 that are, to the extent practicable, uniformly sized and regularly spaced.

The optical system 400 schematically represented in the illustrative implementation of FIG. 1 includes a plurality of optical focusing elements 420. Although the optical focusing elements 420 of various implementations may be independently supported in a fixed spatial relationship with respect to the imaging-sensor array 305, the optical focusing elements 420 of the version of FIG. 1 are formed integrally within a unitary focusing-element array 410. As described in the summary, such a focusing-element array 410 may be formed, for example, from a unitary plate or sheet-like, translucent substrate made from a material such as glass or plastic. Alternatively, individual focusing elements 420 may be adhered or otherwise affixed to a substrate or framework (not shown) in order to retain them in fixed positions relative to the imaging-sensor array 305. The optical focusing elements 420 of alternative versions may be of one or more types, including but not limited to (i) lenses with concave or convex faces, (ii) lenslets, (iii) reflective elements including, for example, concave mirrors and (iv) graded-refractive-index (GRIN) elements including GRIN optical fibers, by way of non-limiting example.

Referring still to the illustrative version of FIG. 1, the detector array 305 comprises a plurality of predefined detector-array sections 320, each of which detector-array sections 320 itself comprises at least two detector-array subsections 325. The detector-array subsections 325 of each detector-array section 320 are dedicated to the detection of a common wavelength set associated with the detector-array section 320 to which those detector-array subsections 325 belong. For clarity in the description and associated drawings (including FIG. 1), each detector-array section is identified by a reference character including the number "320" that identifies it generally as a detector-array section, followed by a capital letter (e.g., A, B, C . . . ) identifying it more specifically as being associated with the detection of a particular wavelength set (e.g., $\lambda_A$, $\lambda_B$, $\lambda_C$, etc.). Similarly, each detector-array subsection is referenced by a set of characters including the number "325," identifying it as a subsection, followed by a capital letter (e.g., A, B, C . . . ) identifying it more specifically as being associated with the detection of a particular wavelength set. Moreover, for the sake of simplicity in the description, each detector-array section 320 of FIG. 1 is depicted to include only two subsections 325 and the detector assembly 300 is configured for the focusing and detection of images of a scene over four wavelength sets (i.e., $\lambda_A$, $\lambda_B$, $\lambda_C$, and $\lambda_D$). In FIG. 1, detector-array sections 320 are delineated from one another by dashed boundaries and, within each detector-array section 320, detector-array subsections 325 are delineated from one another by dotted boundaries. When referred to collectively or non-specifically in this description, the detector-array sections 320 and the detector-array sub-sections 325 are referenced without alphabetic characters, despite the fact that no such "collective" or "generalized" reference character is used in the drawings. A similar convention applies to elements, and their associated reference characters, introduced later in this description. Moreover, the use of the additional subscripted characters "s" and "L" is explained later in this description.

Each focusing element 420 is optically aligned for focusing upon a corresponding one of the plurality of detector-array sub-sections 325 an image of a scene correlating to the images of the same scene focused upon other detector-array sub-sections 325 by the other focusing elements 420. Each focusing element 420 and its corresponding array sub-section 325 define a unique optical path that, in FIG. 1, is indicated by a dashed arrow. Accordingly, in versions of the type currently under consideration, each detector-array section 320 has associated with it at least two optical paths. In a manner similar to which each of the detector-array sections and sub-sections 320 and 325 is associated with the detection of a particular wavelength by the inclusion of a letter (A, B, C and D) in its reference character, each optical focusing element 420 is referenced by a reference indicator including a letter indicative of the wavelength set with which that focusing element 420 is associated.

The detector assembly 300 further includes a plurality of optical filtering elements 460. Each of filtering elements 460A, B, C and D is configured to pass a pre-selected wavelength set that is (i) of interest and (ii) within the sensitivity range of the detector array 305. In the illustrative version of FIG. 1, two detector-array subsections 325 are associated with each common detector-array section 320 and have projected thereon images commonly filtered by a single optical filtering element 460. In other words, each optical filtering element 460 is situated within at least two optical paths associated with a common detector-array section 320. As noted in the summary, for purposes of this specification and the appended claims, "optical path" is defined such that each optical path extends forward of the focusing element 420 that defines it. Accordingly, while the optical filtering elements 460 associated with the configuration of FIG. 1 are situated between the focusing elements 420 and their corresponding detector-array subsections 325, alternative embodiments within the scope and contemplation of the invention include at least one optical path $P_O$ for which the focusing element 420 is situated between the filtering element 460 and the corresponding detector-array subsection 325. Consistent with the referencing scheme used to identify focusing elements 420 and detector-array subsections 325 associated with each of the different wavelength sets $\lambda_A$, $\lambda_B$, $\lambda_C$, and $\lambda_D$, each filtering element 460 in FIG. 1 is identified with the passing of a particular wavelength set by the inclusion in the reference character of one of the letters A, B, C and D. In the version of FIG. 1, each of the optical filtering elements 460A, B, C and D associated with, respectively, the four wavelength sets $\lambda_A$, $\lambda_B$, $\lambda_C$, and $\lambda_D$ is part of a unitary filter array 450; however, just as with the focusing elements 420 of alternative versions, the filtering elements 460 could be independently supported in fixed spatial relationship with the image-sensor array 305.

As discussed in the summary, the plural images associated with each wavelength set over which alternative implementations acquire, register and analyze image data may be utilized for various purposes. For instance, in an embodiment having the capacity to acquire and analyze two images over each selected wavelength set, the images could be redundant images of similar size in order to preserve the operable integrity of the system if, for example, the focusing element 420, filtering element 460 or array subsection 325 associated with an optical path is damaged. However, as also discussed in the summary, various versions are envisioned in which scenes are monitored through the acquisition and analysis of small images and then through the acquisition, storage and algorithmic analysis of larger images when, within the monitored scene, an apparent event meeting predetermined threshold criteria "triggers" the acquisition, storage an/or analysis of each of one or more larger images acquired over at least one predetermined wavelength set.

In the illustrative system of FIG. 1, each of predetermined wavelength sets $\lambda_A$, $\lambda_B$, $\lambda_C$, and $\lambda_D$ has associated with it small and large focusing elements 420 for projecting upon the detector array 305 a small image and a large image of a scene. For instance, in FIG. 1, wavelength set $\lambda_A$ has associated with it a small focusing element 420A$_S$ and a large focusing element 420A$_L$ that define, in combination with corresponding small and large detector-array sub-sections 325A$_S$ and 325A$_L$, two optical paths P$_O$ along which light within wavelength set $\lambda_A$ propagates. In similar fashion, each of the other three illustrative wavelength sets $\lambda_B$, $\lambda_C$, and $\lambda_D$ has associated with it two corresponding focusing elements 420, a filtering element 460 and two detector-array sub-sections 325, one large and one small. Such a detector assembly 300 can be variously incorporated into a spectral analysis system 100 that registers, stores and algorithmically analyzes data associated with the large detector-array sub-sections 325 depending on whether the particular system 100 is programmed to include at least one of a (i) power-saving, (ii) memory-saving and (iii) process-saving mode as described more completely in the summary.

Figure 2:
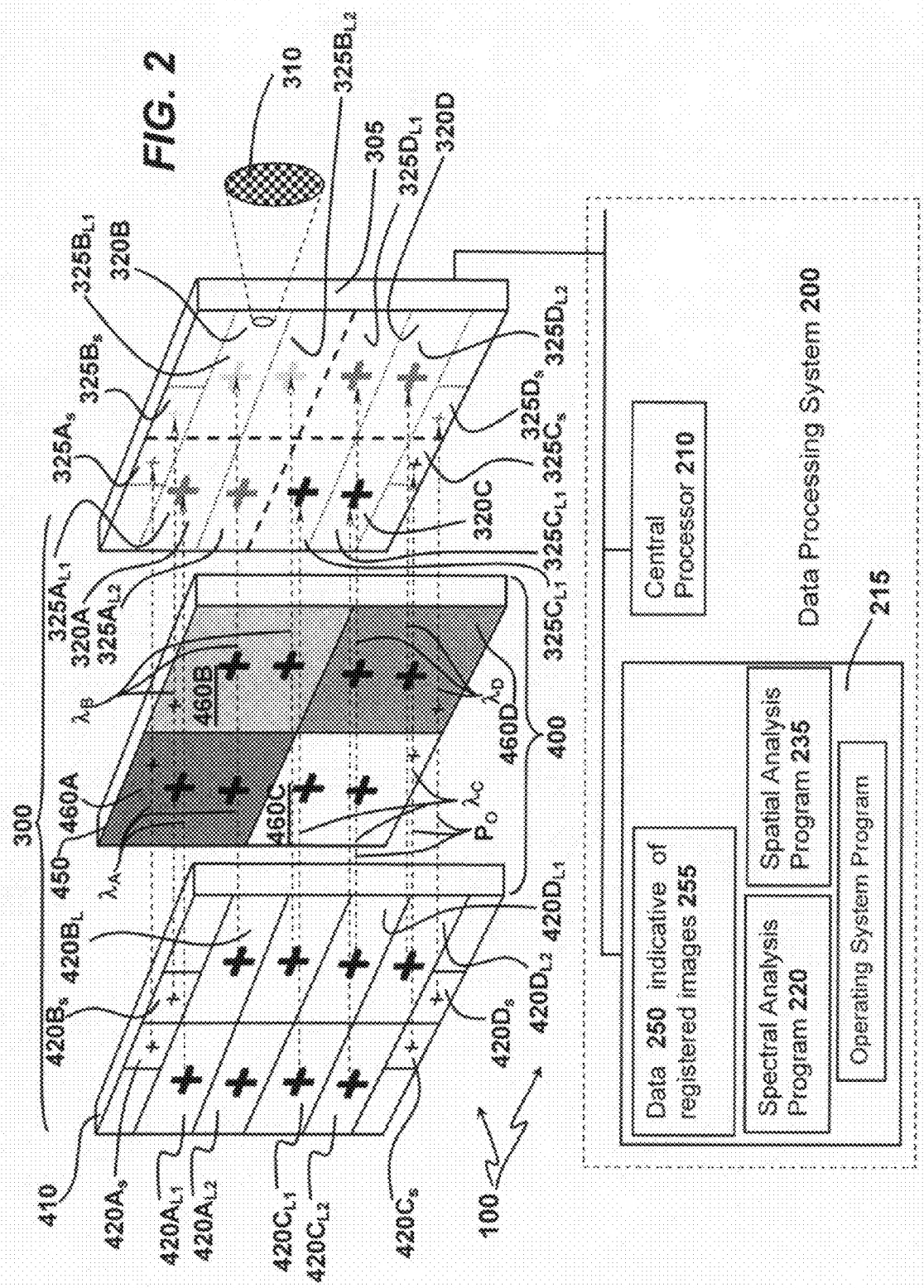
FIG. 2 schematically depicts a spectral analysis system similar to the spectral analysis system of FIG. 1, but incorporating an alternatively configured multi-image detector assembly.

Although innumerable configurations of a detector assembly 300 are regarded as within the scope and contemplation of the invention as defined in the appended claims, for illustrative purposes, FIG. 2 depicts a spectral analysis system 100 including a detector assembly 300 configured to produce, in association with each of selected wavelength sets $\lambda_A$, $\lambda_B$, $\lambda_C$, and $\lambda_D$, duplicate large images. In most respects, the description of the version of FIG. 1 applies to the version of FIG. 2. Accordingly, as between the alternative versions depicted in FIGS. 1 and 2, like reference characters are used to refer to similar or analogous components with specific differences being noted only where indicated in order to facilitate clarity and comprehension.

With reference to the version of FIG. 2, each of four detector-array sections 320 has associated with it three detector-array sub-sections 325 including a single detector-array sub-section 325 dedicated to the registration of a small image and two detector-array sub-sections 325 dedicated to the registration of duplicative large images. Within each detector-array section 320, the large detector-array sub-sections 325 are distinguished from one another by the addition of a "1" or "2" after the reference character "L" that distinguishes the large detector-array sub-sections 325 from the small detector-array subsection 325. Accordingly, with specific illustrative reference to the detector-array section 320A associated with the registration of images over wavelength set $\lambda_A$, a first detector-array sub-section dedicated to the registration of large images is identified by the reference character 325A$_{L1}$, while the second detector-array sub-section dedicated to the registration of large images duplicative of the large images registered at the detector-array sub-section 325A$_{L1}$ is identified by the reference character 325A$_{L2}$. In keeping with this modified reference-character convention, the focusing elements that project the small image and the first and second large images onto the corresponding detector-array sub-sections 325A$_S$, 325A$_{L1}$ and 325A$_{L2}$ are identified by, respectively, reference characters 420A$_S$, 420A$_{L1}$ and 420A$_{L2}$. In all other material respects, the description of the version of FIG. 1 is regarded as sufficiently explanatory of the version of FIG. 2 to render additional superfluous further explanation of the version of FIG. 2. Moreover, the version depicted in FIG. 2 renders sufficiently disclosed versions including multiple focusing elements 420 of the same f-number for producing only images of similar size and pixel count in association with each selected wavelength set (e.g., $\lambda_A$, $\lambda_B$, $\lambda_C$, and $\lambda_D$). An illustrative example of the latter type appears as does the version of FIG. 2 wherein the focusing elements 420A$_S$, 420B$_S$, 420C$_S$, and 420D$_S$, and their corresponding array subsections 325A$_S$, 325B$_S$, 325C$_S$, and 325D$_S$, are absent.

The foregoing is considered to be illustrative of the principles of the invention. Furthermore, since modifications and changes to various aspects and implementations will occur to those skilled in the art without departing from the scope and spirit of the invention, it is to be understood that the foregoing does not limit the invention as expressed in the appended claims to the exact constructions, implementations and versions shown and described.

What is claimed is:

1. A multi-image detector assembly for detecting a plurality of correlated images of a single scene over a plurality of disparate electromagnetic wavelength sets, the detector assembly comprising:
   an array of detector elements, the array comprising a plurality of detector-array sections, each detector-array section comprising at least two detector-array subsections dedicated to the detection of a common wavelength set associated with that detector-array section;
   a plurality of optical focusing elements, each focusing element aligned for focusing upon a corresponding one of the plurality of detector-array sub-sections an image of the scene correlating to the images of the scene focused upon other detector-array sub-sections by the other focusing elements of the plurality of focusing elements, each focusing element and its corresponding detector-array sub-section defining an optical path; and
   a plurality of optical filtering elements, each filtering element being configured to pass a selected wavelength set;
   wherein (i) each detector-array section has associated with it at least two optical paths, (ii) each optical filtering element is disposed within at least two optical paths associated with a common detector-array section, and (iii) when the detector assembly is in an operative mode, image detection occurs continuously and simultaneously over plural disparate detector-array sections in order to provide a correlated set of images over plural wavelength sets.

2. The detector assembly of claim 1 wherein at least two focusing elements associated with a single detector-array section exhibit disparate f-numbers.

3. The detector assembly of claim 2 wherein at least two focusing elements associated with a single detector-array section and exhibiting disparate f-numbers are situated with respect to the detector array such that a first focusing element with the larger f-number projects upon the detector array a first image and a second focusing element with the smaller f-number projects upon the detector array a second image similar to the first image, but enlarged relative thereto.

4. The detector assembly of claim 3 wherein (i) each detector-array section has associated with it at least three optical paths and (ii) at least two of the at least three optical paths are defined by focusing elements exhibiting the same f-number such that at least two of the images of a scene projected upon the detector array within each detector-array section are of similar size.

5. The detector assembly of claim 4 wherein all of the at least three optical paths associated with each detector-array section are commonly filtered by a single optical filtering element.

6. The detector assembly of claim 4 wherein at least two of the at least three optical paths associated with each detector-array section are defined by focusing elements exhibiting the smaller f-number such that duplicative images of mutually similar sizes larger than the image projected by the first focusing element with the larger f-number are projected upon the detector array within the detector-array section.

7. The detector assembly of claim 6 wherein all of the at least three optical paths associated with each detector-array section are commonly filtered by a single optical filtering element.

8. The detector assembly of claim 4 wherein at least two of the at least three optical paths associated with each detector-array section are defined by focusing elements exhibiting the larger f-number such that duplicative images of mutually similar sizes smaller than the image projected by the second focusing element with the smaller f-number are projected upon the detector array within the detector-array section.

9. The detector assembly of claim 8 wherein all of the at least three optical paths associated with each detector-array section are commonly filtered by a single optical filtering element.

10. The detector assembly of claim 1 wherein at least two of the at least two focusing elements associated with a single detector-array section exhibit the same f-number such that at least two of the images of a scene projected upon the detector array within each detector-array section are of similar size.

11. The detector assembly of claim 10 wherein all of the at least two detector-array subsections associated with each common detector-array section are configured to register images that are commonly filtered by a single optical filtering element.

* * * * *